US011269886B2

(12) United States Patent  
Meng et al.

(10) Patent No.: US 11,269,886 B2  
(45) Date of Patent: Mar. 8, 2022

(54) APPROXIMATE ANALYTICS WITH QUERY-TIME SAMPLING FOR EXPLORATORY DATA ANALYSIS

(71) Applicant: SAP SE, Walldorf (DE)

(72) Inventors: Xiao Meng, Waterloo (CA); Gunes Aluc, Waterloo (CA)

(73) Assignee: SAP SE, Walldorf (DE)

(*) Notice: Subject to any disclaimer, the term of this patent is extended or adjusted under 35 U.S.C. 154(b) by 265 days.

(21) Appl. No.: 16/292,511

(22) Filed: Mar. 5, 2019

(65) Prior Publication Data

US 2020/0286011 A1 Sep. 10, 2020

(51) Int. Cl.
| | |
|---|---|
| *G06F 16/24* | (2019.01) |
| *G06F 16/2455* | (2019.01) |
| *G06Q 10/06* | (2012.01) |
| *G06F 16/248* | (2019.01) |
| *G06F 16/242* | (2019.01) |
| *G06F 16/245* | (2019.01) |
| *G06N 3/04* | (2006.01) |
| *G06F 16/26* | (2019.01) |

(Continued)

(52) U.S. Cl.  
CPC ........ *G06F 16/2456* (2019.01); *G06F 16/22* (2019.01); *G06F 16/242* (2019.01); *G06F 16/245* (2019.01); *G06F 16/248* (2019.01); *G06F 16/26* (2019.01); *G06N 3/04* (2013.01); *G06Q 10/063* (2013.01); *G06N 7/00* (2013.01)

(58) Field of Classification Search  
None  
See application file for complete search history.

(56) References Cited

U.S. PATENT DOCUMENTS 6,108,658 A * 8/2000 Lindsay .................. G06F 7/22  
6,185,560 B1 * 2/2001 Young ................... F25B 41/20  
707/776

(Continued)

OTHER PUBLICATIONS

Agarwal, Sameer, et al. "BlinkDB: queries with bounded errors and bounded response times on very large data." Proceedings of the 8th ACM European Conference on Computer Systems. 2013. (Year: 2013).*

(Continued)

*Primary Examiner* — Gurkanwaljit Singh  
(74) *Attorney, Agent, or Firm* — Buckley, Maschoff & Talwalkar LLC

(57) ABSTRACT

A system and method are disclosed to facilitate exploratory data analytics for an enterprise. A storage area network, for a column-oriented relational database management system, may contain electronic records that store enterprise information. A query engine may receive, from a user via an interactive user interface, query parameters associated with the enterprise information. The query engine may then automatically generate an approximate query for exploratory data analytics using query-time sampling, the approximate query being associated with at least one of: (1) a stratified sampler with randomized row access, and (2) a hash-based, outlier aware join sampler. The approximate query may then be executed in connection with the enterprise information in the storage area network, and results of the executed approximate query may be provided to the user via the user interface.

16 Claims, 13 Drawing Sheets

(51) Int. Cl.
  *G06F 16/22*    (2019.01)
  *G06N 7/00*     (2006.01)

(56) References Cited

U.S. PATENT DOCUMENTS

| | | | | |
|---|---|---|---|---|
| 6,519,604 | B1* | 2/2003 | Acharya | G06F 16/2462 |
| | | | | 707/738 |
| 9,223,720 | B2* | 12/2015 | Chase | G06F 16/9014 |
| 9,953,054 | B2* | 4/2018 | Collins | G06F 16/2255 |
| 10,635,651 | B2* | 4/2020 | Pederson | G06F 16/24542 |
| 11,023,486 | B2* | 6/2021 | Agrawal | G06F 16/248 |
| 11,061,916 | B1* | 7/2021 | Ting | G06F 16/2465 |
| 2002/0103793 | A1* | 8/2002 | Koller | G06F 16/2462 |
| 2002/0124001 | A1* | 9/2002 | Chaudhuri | G06F 16/2462 |
| 2004/0249810 | A1* | 12/2004 | Das | G06F 16/2462 |
| 2014/0201126 | A1* | 7/2014 | Zadeh | A61B 5/165 |
| | | | | 706/52 |
| 2014/0317087 | A1* | 10/2014 | Collins | G06F 16/2255 |
| | | | | 707/715 |
| 2015/0046482 | A1* | 2/2015 | Wang | G06F 16/212 |
| | | | | 707/756 |
| 2015/0169467 | A1* | 6/2015 | Chase | G06F 16/9014 |
| | | | | 711/216 |
| 2015/0363469 | A1* | 12/2015 | Peloski | G06F 16/24568 |
| | | | | 707/741 |
| 2016/0358312 | A1* | 12/2016 | Kolb, V | G06T 3/40 |
| 2018/0204111 | A1* | 7/2018 | Zadeh | G06N 3/0436 |

OTHER PUBLICATIONS

Park, Yongjoo, et al. "Database learning: Toward a database that becomes smarter everytime." Proceedings of the 2017 ACM International Conference on Management of Data. 2017. (Year: 2017).*
Pedersen, Torben Bach, and Christian S. Jensen. "Multidimensional database technology." Computer 34.12 (2001): 40-46. (Year: 2001).*
Kepner, Jeremy, et al. "Computing on masked data: a high performance method for improving big data veracity." 2014 IEEE High Performance Extreme Computing Conference (HPEC). IEEE, 2014. (Year: 2014).*
Haas, Peter J., et al. "Discovering and exploiting statistical properties for query optimization in relational databases: A survey." Statistical Analysis and Data Mining: The ASA Data Science Journal 1.4 (2009): 223-250. (Year: 2009).*
Gibbons, Phillip B. "Distinct sampling for highly-accurate answers to distinct values queries and event reports." VLDB. vol. 1. 2001. (Year: 2001).*
Callan, Jamie, and Margaret Connell. "Query-based sampling of text databases." ACM Transactions on Information Systems (TOIS) 19.2 (2001): 97-130. (Year: 2001).*
Callan, Jamie, et al. "The effects of query-based sampling on automatic database selection algorithms." (2000). (Year: 2000).*
Azzopardi, Leif, Mark Baillie, and Fabio Crestani. "Adaptive query-based sampling for distributed IR." Proceedings of the 29th annual international ACM SIGIR conference on Research and development in information retrieval. 2006. (Year: 2006).*
Babcock, Brian, Surajit Chaudhuri, and Gautam Das. "Dynamic sample selection for approximate query processing." Proceedings of the 2003 ACM SIGMOD international conference on Management of data. 2003. (Year: 2003).*

* cited by examiner

APPROXIMATE ANALYTICS WITH QUERY-TIME SAMPLING FOR EXPLORATORY DATA ANALYSIS

BACKGROUND

As the volume of data generated by enterprises continues to increase, Exploratory Data Analysis ("EDA") is becoming an integral part of the everyday business process. As used herein, the term "EDA" may refer to any data analysis process that maximizes insight into a dataset, uncovers underlying structures within the data, extracts important variables, detects outliers and anomalies, tests underlying assumptions, develops parsimonious models, and/or determines optimal factor settings. Often viewed as the first and most crucial step in the data analysis pipeline, EDA provides data scientists and business analysts powerful insight into their data. Unlike Confirmatory Data Analysis ("CDA"), where hypotheses are tested and assumptions are challenged, EDA is performed to understand which hypotheses and assumptions might potentially be drawn from the data. This is an important step to make sense of the data and determine which questions to ask next (as well as to derive potential methods to probe the data). In a sense, EDA lays out the foundations for subsequent data analysis tasks.

One use case for EDA is in business intelligence to help understand consumer behavior. For example, by performing EDA in connection with purchase data, business analysts can find products that are frequently purchased together, mine associations between merchandise that are non-trivial to detect, determine peak hours of purchase, filter out irrelevant information in the dataset for a more focused analysis, etc. Another example of EDA usage is public service and research. By plotting charts over time for regional power usage data, analysts can detect extreme values and locate households with a high or unusual energy consumption. Similarly, performing clustering over disease outbreak data, analysts can help local officials contain epidemics.

While OnLine Analytical Processing ("OLAP") systems in general—and column-oriented Relational DataBase Management Systems ("RDBMS") in particular—are equipped with powerful tools to plough through petabytes of data, analytical queries may take several seconds to execute, which is not always desirable in exploratory data analysis. Note that scientists often need tools for fast visualization of data, and they are interested in identifying subsets of data that need further drilling-down before running computationally expensive analytical functions. In contrast to conventional report-generating tools, these applications have near real-time response requirements and cannot be easily built on top of existing OLAP systems. Approximate Query Processing ("AQP") offers a solution to these problems because it enables queries to be run much faster at the expense of query result accuracy, which is acceptable—and in fact, desirable—in EDA.

It would therefore be desirable to provide approximate analytics for exploratory data analysis in a fast, automatic, and accurate manner.

SUMMARY

Some embodiments described herein extend a disk-based column-oriented RDBMS to support approximate query processing for exploratory data analysis using a technique known as query-time sampling. Specifically, samplers may include: (i) a stratified sampler with randomized row access to address the early-row bias problem in sampling, and (ii) a hash-based sampler that is outlier-aware. Together with some pre-existing sampling techniques, these new samplers may be implemented as query plan operators using the Polymorphic Table Function ("PTF") technology that allows users to define their own query plan operators.

Some embodiments describe a system and method to facilitate exploratory data analytics for an enterprise. A storage area network, for a column-oriented relational database management system, may contain electronic records that store enterprise information. A query engine may receive, from a user via an interactive user interface, query parameters associated with the enterprise information. The query engine may then automatically generate an approximate query for exploratory data analytics using query-time sampling, the approximate query being associated with at least one of: (1) a stratified sampler with randomized row access, and (2) a hash-based, outlier aware join sampler. The approximate query may then be executed in connection with the enterprise information in the storage area network, and results of the executed approximate query may be provided to the user via the user interface.

Some embodiments comprise: means for receiving, at a query engine from a user via an interactive user interface, query parameters associated with enterprise information stored as electronic records in a storage area network for a column-oriented relational database management system; means for automatically generating, by the query engine, an approximate query for exploratory data analytics using query-time sampling, the approximate query being associated with at least one of: (1) a stratified sampler with randomized row access, and (2) a hash-based, outlier aware join sampler; means for executing the approximate query in connection with the enterprise information in the storage area network; and means for providing results of said executed approximate query to the user via the user interface.

Some technical advantages of some embodiments disclosed herein are improved systems and methods to provide approximate analytics with query-time sampling for exploratory data analysis in a fast, automatic, and accurate manner.

DETAILED DESCRIPTION

Figure 1:
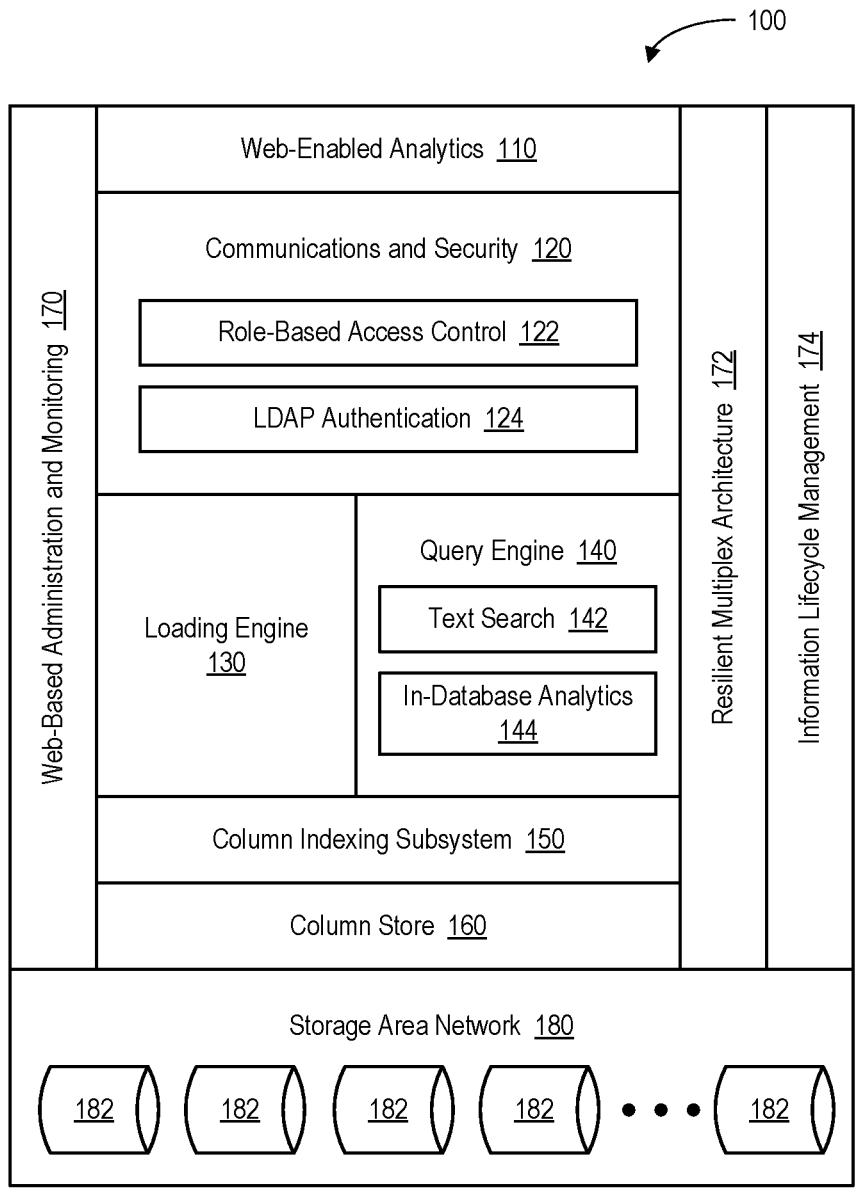
FIG. 1 is a high-level block diagram of a system that might utilize approximate analytics for exploratory data analysis in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In this document, we describe how a disk-based column-oriented RDBMS may support approximate query processing for exploratory data analysis using a technique known as "query-time sampling." Sampling remains to be one of the most commonly-used data synopsis techniques in AQP (among other techniques such as histograms, wavelets, and sketches). Sampling can be done either offline, where auxiliary data structures are built when data are loaded and updated incrementally, or at runtime when queries are executed. The latter technique is referred to as "query-time sampling."

One advantage of query-time sampling will now be described. While pre-computed samples (i.e., offline sampling) can reduce response times by sampling ahead, these samples cannot adapt well to data updates and changing workloads, and they present no a-priori accuracy guarantees and only support certain types of SQL queries. In contrast, query time sampling may lend itself better to changing workloads and remain compatible with the full functionality of SQL.

A petabyte-scale, column-oriented and disk-based RDBMS may be used for business intelligence, data warehousing and data marts. One primary function may be to analyze large amounts of data in a distributed, low-cost and highly available environment. Such an approach may facilitate commercialization of column-store technology.

To implement query-time sampling, some embodiments rely on a Polymorphic Table Function (PTF) feature, which is a special kind of User-Defined Function ("UDF"). Specifically, UDFs fall into two main categories: (i) scalar and aggregate UDFs and (ii) table consuming/producing UDFs (these are further classified as non-polymorphic and polymorphic). In some embodiments described herein, PTFs are implemented as specialized query plan operators that are able to hook into C++ code implemented by the user. In essence, by implementing PTFs, users are developing their own query plan operators. Some embodiments let users to inject sampling operators at arbitrary positions in the logical query plan (as long as these operators are placed in a tuple-consuming position), and do not restrict the placement of these operators to be directly on top of base tables.

FIG. 1 is a high-level block diagram of a system 100 that might utilize approximate analytics for EDA in accordance with some embodiments. The system 100 includes web-enabled analytics 110 that exchanges information with communications and security 120. The communications and security might include, for example, role-based access control 122 and Lightweight Directory Access Protocol ("LDAP") authentication 124 (and/or Role-Based Access Control ("RBAC") authorization). A loading engine 130 may provide high performance, fully parallel bulk loading, and a query engine 140 might incorporate text search 142 and in-database analytics 144 capabilities. A column indexing subsystem 150 may utilize Nbit and tiered indexing for increased compression and fast, incremental batch loads. A column store 160 may allow for petabyte scale information access with low latency. Note that web-based administration and monitoring 170, a resilient multiplex grid architecture 172, and/or information lifecycle management 174 may interact with some or all of these elements. A storage area network 180 may include multiple storage elements 182 that contain electronic files representing enterprise information.

The system 100 may facilitate automated approximate analytics for EDA. As used herein, the term "automated" may refer to, for example, actions that can be performed with little or no human intervention. According to some embodiments, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store information into and/or retrieve information from various data stores (e.g., the storage elements 182), which may be locally stored or reside remote portion of the system 100. Although a single system 100 is shown in FIG. 1, any number of such devices may be included. Moreover, various devices described herein might be combined according to embodiments of the present invention. For example, in some embodiments, the loading engine 130 and query engine 140 might comprise a single apparatus. The system 100 functions may be performed by a constellation of networked apparatuses, such as in a distributed processing or cloud-based architecture.

A user (e.g., a database administrator) may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to direct or initiate an enterprise query) and/or provide or receive automatically generated recommendations or results from the system 100.

Figure 2:
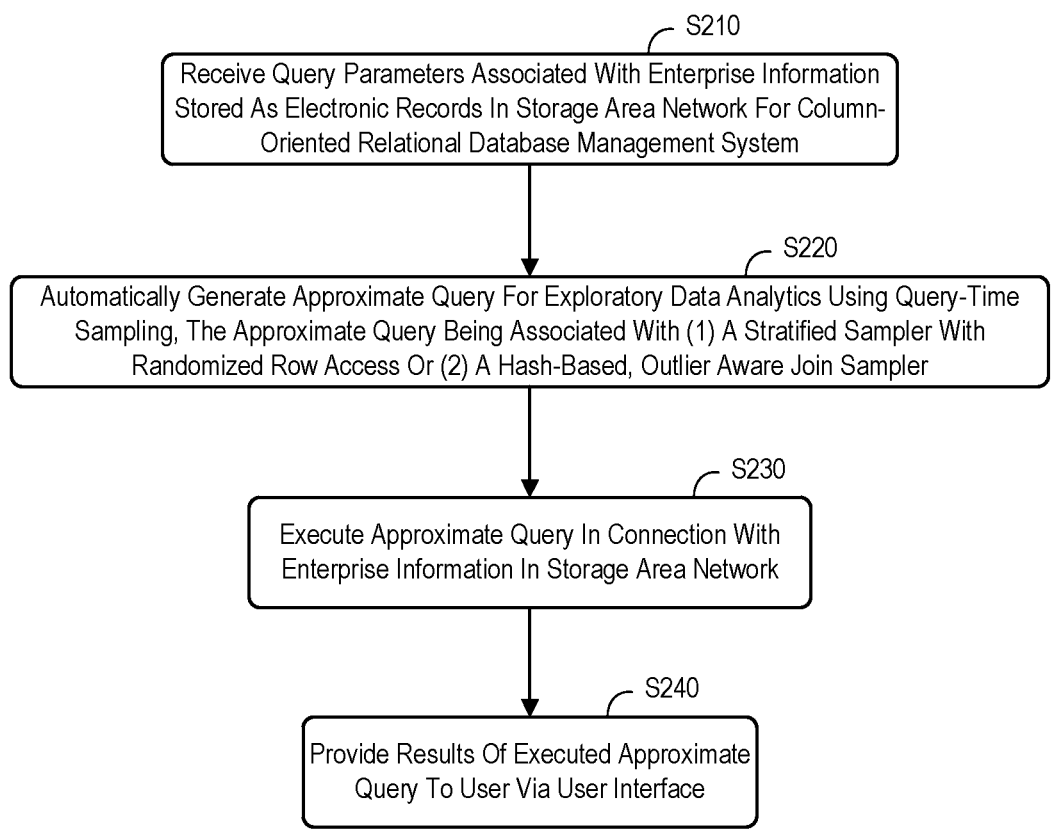
FIG. 2 illustrates an exploratory data analysis method according to some embodiments.

FIG. 2 illustrates an exploratory data analysis method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a query engine may receive, from a user via an interactive user interface, query parameters associated with enterprise information stored as electronic records in a storage area network for a column-oriented relational database management system. The query parameters might be received, for example, via a table-valued user-defined function and/or an external table parameterized function. For example, according to some embodiments, query parameters are received via a polymorphic table function that defines query plan operators.

At S220, the query engine may automatically generate an approximate query for exploratory data analytics using query-time sampling, the approximate query being associated with: (1) a stratified sampler with randomized row access or (2) a hash-based, outlier aware join sampler. As will be described in more detail, when the approximate query is associated with the stratified sampler with randomized row access, approximately a threshold of k rows may be selected for each distinct combination of values in a query column set. Subsequent rows of existing strata may be passed with a probability p. Moreover, according to some embodiments, the user can adjust threshold k and probability p. When the approximate query is associated with the hash-based, outlier aware join sampler, a hash function may be applied to values of columns in a query column set. The hash-based, outlier aware join sampler may retain tuples when the query aggregate set satisfies a criterion based on at least one of: (i) a locality-sensitive hashing, and (ii) extreme value theory. Note that the locality-sensitive hashing may, according to some embodiments, utilize a Morton code or curve.

At S230, the system may execute the approximate query in connection with the enterprise information in the storage area network. At S240, the system may then provide results of said executed approximate query to the user via the user interface.

According to some embodiments, the query engine uses a competitive selection strategy to automatically select between the stratified sampler with randomized row access and the hash-based, outlier aware join sampler. The competitive selection strategy might, for example, fire multiple samplers to process early row sets in parallel and track the quality of each sample using a gap between a smallest and a largest value sampled for each query aggregate set column as a quality measure. The competitive selection strategy might then select the sampler that achieves a highest score after a user-specified number of tuples have been processed.

Figure 3:
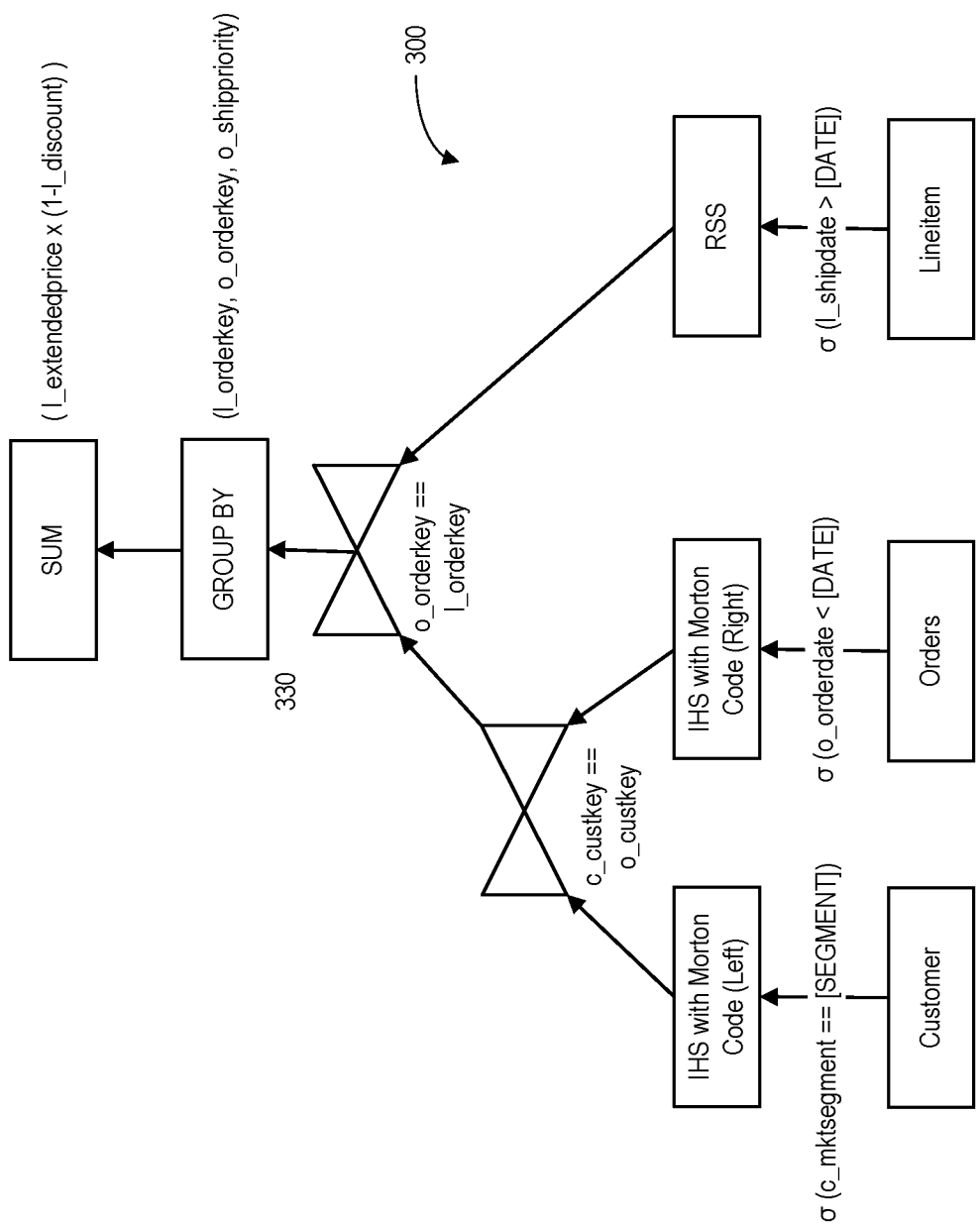
FIG. 3 illustrates query-time sampling operators in accordance with some embodiments.

FIG. 3 illustrates 300 query-time sampling operators where the system makes use of query-time sampling. In this query plan, the system uses two separate sampling operators, namely, a Randomized Stratified Sampler ("RSS") and an Informed Hash Sampler ("IHS") with Morton code. The IHS operators are placed to consume the outputs of the selection operators on the customer and orders tables. Then, the output of the IHS operators are fed into a join on c_custkey=o_custkey. The RSS operator samples the tuples that are produced by the selection operator on the lineitem table before the output is fed into the join on o_orderkey=l_orderkey. This sampling task can be expressed using the following SQL statements demonstrating the use of query-time sampling:

```
1    SELECT
2        l_orderkey,
3        sum(l_extendedprice * (1 – l_discount))
4            as revenue,
5        o_orderdate,
6        o_shippriority
7
8    FROM
9        ihs_with_morton_code(
10           TABLE(
11               SELECT    c_custkey
12               FROM      customer
13               WHERE     c_mktsegment = [SEGMENT]
14           ),
15           <other-configuration-parameters>
16       ),
17       ihs_with_morton_code(
18           TABLE(
19               SELECT    o_custkey,
20                         o_orderkey,
21                         o_orderdate,
22                         o_shippriority
23               FROM      orders
24               WHERE     o_orderdate < [DATE]
25           ),
26           ... /*other-configuration-parameters*/
27       ),
28       rss(
29           TABLE(
30               SELECT    l_orderkey,
31                         l_extendedprice,
32                         l_discount
33               FROM      lineitem
34               WHERE     l_shipdate > [DATE]
35           ),
36           ... /*other-configuration-parameters*/
37       )
38
39   WHERE
40       c_custkey = o_custkey and
41       l_orderkey = o_orderkey
42
43   GROUP BY
44       l_orderkey,
45       o_orderdate,
46       o_shippriority
47
48   ORDER BY
49       revenue desc,
50       o_orderdate;
```

Some embodiments utilize a Query Aggregate Set ("QAS") and a Query Column Set ("QCS"). The QAS consists of the set of columns that appear in the aggregation operators in a query. For example, the QAS for a query might consist of the columns l_extendedprice and l_discount. On the other hand, the QCS denotes the set of columns in the input tables that appear in the WHERE, GROUP BY and HAVING clauses in the query. These columns either directly appear in the answer set or indirectly determine which tuples should be included in the answer. The QCS might consist of, for example, the columns c_custkey, c_mktsegment, o_custkey, o_orderkey, o_orderdate, o_shippriority, l_orderkey, and l_shipdate.

Sampling techniques have been used extensively in data management and database management systems. However, existing techniques for sampling still have their shortcomings. First, the most commonly used sampling techniques (e.g., uniform random sampling) do not work well when the data are skewed. Second, there is a need to preserve "interesting" values (e.g., outliers, extreme values, etc.) from petabytes of data, especially when aggregates are involved. However, samplers often perform poorly when it comes to preserving outliers and extreme values. Third, as data scientists issue more sophisticated queries, the need for supporting samplers that can efficiently handle joins (i.e., without compromising the quality of query results) increases. As a result, embodiments may provide a new set of query-time sampling techniques and implement them as PTFs to support the aforementioned use cases and handle a wider range of data and workload patterns.

Some embodiments utilize a Randomized Stratified Sampler ("RSS") to address some of the limitations of the Uniform Random Sampler ("URS"). In particular, uniform sampling might not perform well with skewed data, especially in regions with low support (i.e., where the sampler cannot generate sufficiently large samples due to the "uniformness" of sampling). RSS may overcome the weaknesses of uniform sampling by accepting approximately k rows for each distinct combination of values in the Query Column Set ("QCS"). This may help guarantee the inclusion of low support groups in the sample. This is a technique is generally referred to as "stratified sampling."

| | |
|---|---|
| 1 | Input: Input Table T, query column set C, threshold k, predefined probability p ∈ [0,1]; |
| 2 | Output: A sample table SAMP (with the same schema as T). |
| 3 | Initialization: |
| 4 | Table SAMP = ∅; |
| 5 | Count-min sketch cms = ∅; |
| 6 | n = number of tuples in T; |
| 7 | Randomized access sequence S = Permutation (0 1 2 ... n−1 n−1); |
| 8 | foreach $s_i$ in S (i.e. for each tuple of T) do |
| 9 |   if cms(T[$s_i$]) ≥ k then |
| 10 |     Pr = random float in [0,1]; |
| 11 |     if Pr ≤ p then |
| 12 |       add T[$s_i$] to output table SAMP; |
| 13 |     end |
| 14 |   else |
| 15 |     add T[$s_i$] to output table SAMP; |
| 16 |     increment cms(T[$s_i$]) by 1; |
| 17 |   end |
| 18 | end |
| 19 | return SAMP; |

Consider the pseudo-code of the RSS sampler. Given a query column set C, a threshold k and a probability value p, the algorithm accepts approximately k rows for every distinct combination of values in C. Then, subsequent rows of existing strata are passed with a probability of p. According to some embodiments, users can control the size of the sample that is generated by the algorithm by adjusting p or k (or both). The implementation of RSS as a query-time sampling operator is non-trivial for the following reasons:

1. The set of distinct combinations of query column set values can be very large; and
2. The accuracy of the approach is sensitive to the order in which rows are consumed (e.g., rows that are processed earlier by RSS may unfairly influence the final aggregates).

Embodiments may overcome the first challenge by relying on a count-min sketch as opposed to keeping track of the exact counts of samples generated for each QCS combination. A count-min sketch is a memory-efficient data structure that uses hashing to approximate the frequency of events in a data stream. Count-min sketches may overestimate the true frequency of an event, but they will never underestimate the counts. The application of count-min sketches in stratified sampling to implement a query-time sampling operator is unique to RSS.

Embodiments may address the second challenge by consuming multiple streams of input from the base tables (or intermediate results) in parallel and considering only a randomly selected subset of rows from each stream. In this way, embodiments may help ensure that the RSS operator has a chance to consider a wider portion of the table before approximately k rows from each QCS group have been sampled. This is another novelty of RSS when compared to existing techniques.

Figure 5:
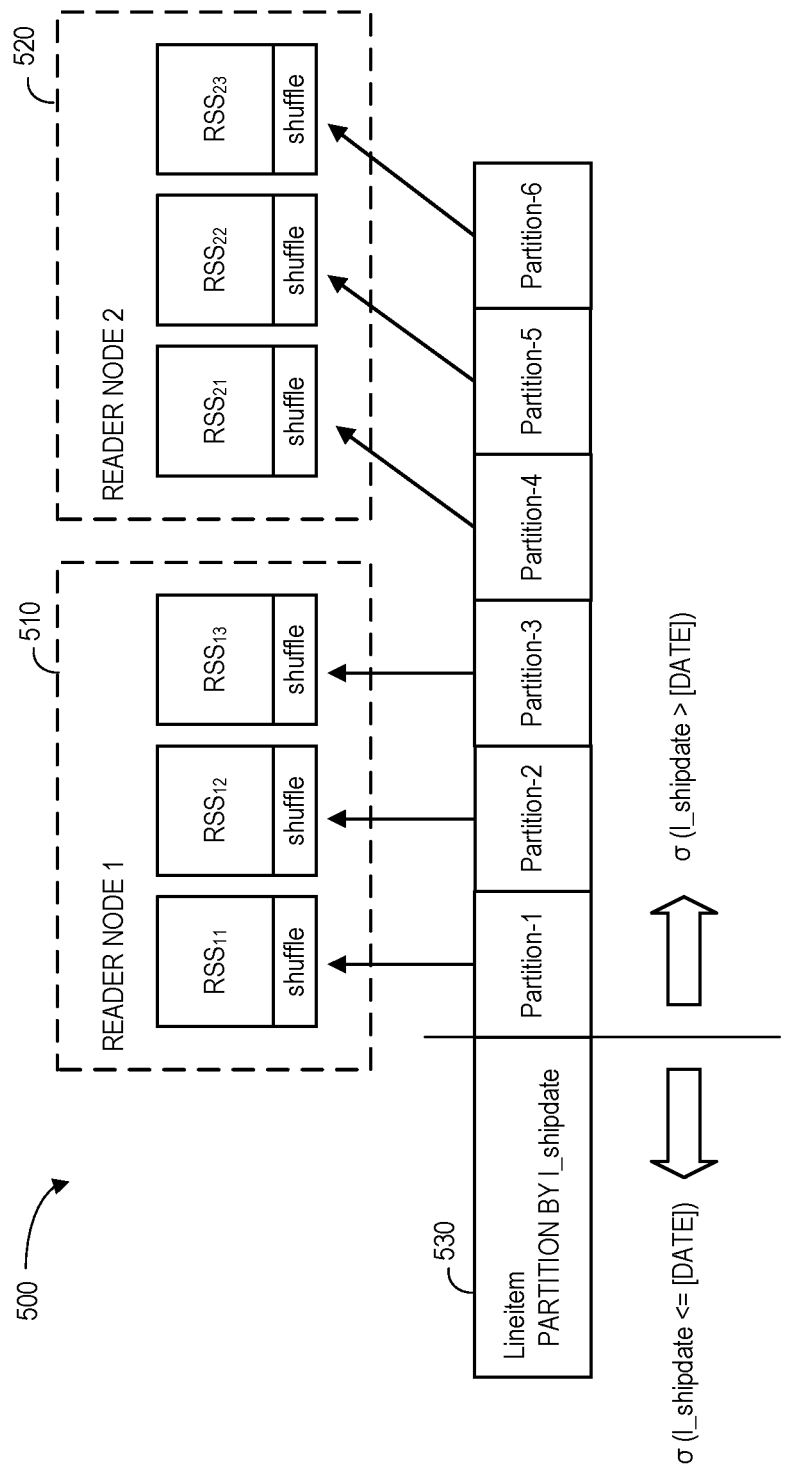
FIG. 5 illustrates parallel execution of random stratified sampler operators in accordance with some embodiments.

A UDF infrastructure may support highly parallel executions (both in simplex as well as in a distributed setting); therefore, implementing these ideas using the existing infrastructure may be relatively straightforward. Consider an RSS operator in a query plan. By adding the following PARTITION BY clause to the original SQL statement, the system may be able to execute the query plan in parallel using shadow (i.e., scale-up) and DQP (scale-out) parallelism. These ideas are illustrated 500 in FIG. 5 via reader node 1 510, reader node 2 520, and Lineitem partitions 530. Consider the following statement:

```
rss(
    TABLE(
        SELECT      l_orderkey,
                    l_extendedprice,
                    l_discount
        FROM        lineitem
        WHERE       l_shipdate > [DATE]
    ),
    ... /*other-configuration-parameters*/,
    OVER( PARTITION BY( l_shipdate ) )
)
```

RSS is a suitable operator for detecting extreme values because by including each distinct value combination of QCS in the sample, it strives to ensure that the extreme values in the QAS are also included. The only exception is the case where values in the QCS are clustered (and similar to each other) but the values in the QAS are diverse. This challenge may be addressed with another set of query-sampling operators as will be described.

A join sampler, namely, a Universe Sampler ("UnS") may be arranged such that input to both sides of an equi-join operator are sampled using the same hash function. The hash function is applied to the values of columns in the join predicates (i.e., QCS), thus, ensuring that the sampled tuples that flow through the operator can be joined. This scheme significantly reduces the cost of executing the join operation and, at the same time, is able to preserve the original join cardinality.

Figure 4:
FIG. 4 is a table including types of extreme values and outliers needed to compute accurate results according to some embodiments.

On the downside, the UnS does not take into account the values in the QAS, which may be relevant in the query plan later on, especially if the output of the join operator is piped into other operators (e.g., join, projection, aggregation). This may result in dropping extreme values or outliers from the sample that are needed for accurately computing the results of aggregates. FIG. 4 is a table 400 including types of extreme values and outliers needed to compute accurate results for different aggregate functions according to some embodiments.

Embodiments may utilize an Informed Hash Sampler ("HIS") to address the aforementioned limitations of the UnS. Specifically, in addition to retaining tuples whose QCS hash to a predefined set of values, the IHS also retains tuples whose QAS satisfy a criterion based on either locality-sensitive hashing or extreme value theory (the same hash function and criterion are used on both sets of input). As used herein, the IHS implementation that relies on locality-sensitive hashing is referred to as the "IHS with Morton code" whereas the one that on extreme value theory is referred to as the "IHS with Extreme Value Theory."

Figure 6:
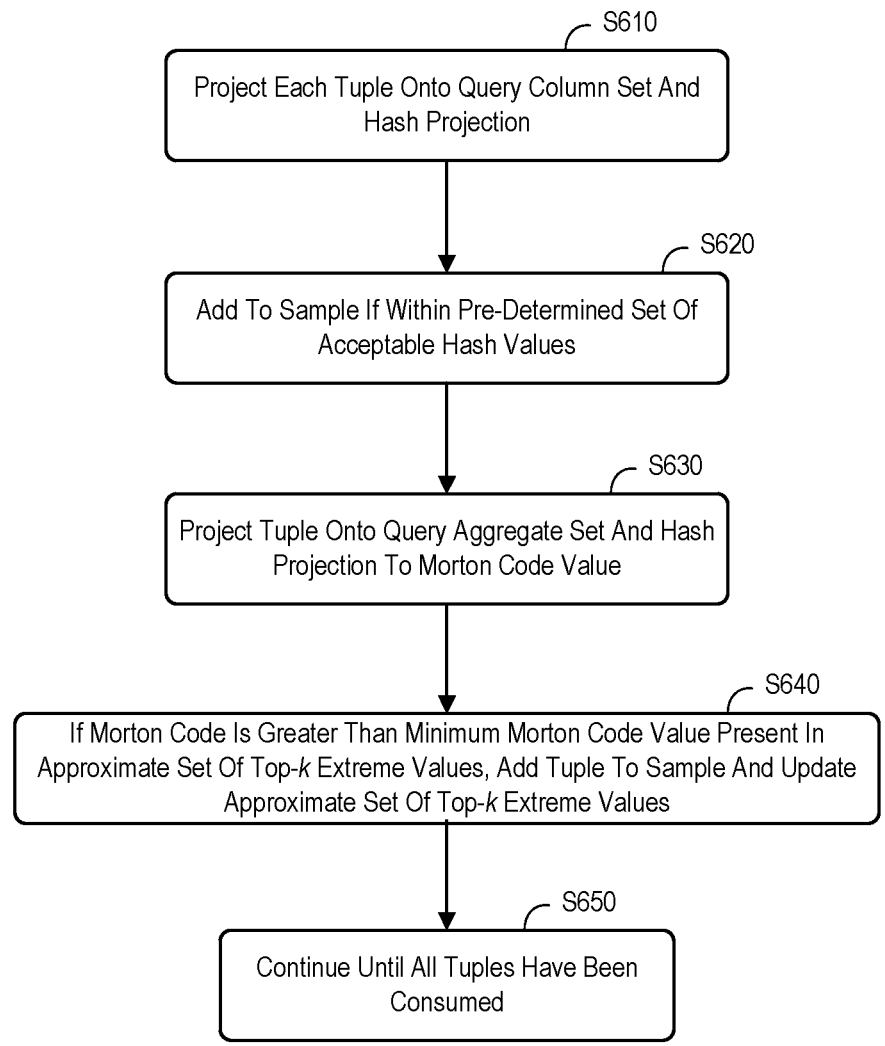
FIG. 6 is an informed hash sampler with Morton code method according to some embodiments.

The IHS with Morton code relies on a locality-sensitive hashing scheme, namely, the Morton code (or curve), to maintain an approximate top-k list of extreme values that should be included in the sampled output (in addition to the values that would have been normally selected by the UnS). More specifically, as tuples (from the two input sets of equi-join) flow through the sampler, the following checks may be performed, and tuples are retained (or rejected) accordingly. FIG. 6 is an informed hash sampler with Morton code method according to some embodiments. At S610, each tuple is projected onto its QCS, and then the projection is hashed to a value using a standard (i.e., non locality-sensitive) hash function. At S620, if the hash value that is computed in S610 is contained within a pre-determined set of acceptable hash values, then the tuple is added to the sample.

Regardless of the outcome of S620, at S630 the tuple is projected onto its QAS, and the projection is hashed to its Morton code. If the Morton code value that is computed in S630 is greater than or equal to the minimum Morton code value that is present in the approximate set of top-k extreme values that are maintained, then at S640 the tuple is added to the sample and the approximate set of top-k extreme values is updated. At S650, the algorithm continues until all tuples (from both sets of input) have been consumed.

The pseudo-code of IHS with Morton Code is provided below. The IHS with Morton code maintains the top-k largest extreme values in a min-heap data structure and can be used alongside aggregation operations such as SUM and MAX.

```
1   Input: Input table T, set of acceptable hash values F, query column
    set QCS, query aggregate set QAS;
2   Output: A sample table SAMP (with the same schema as T).
3   Initialization:
4   Table SAMP = ∅;
5   Table hashSample = ∅;
6   Table outlierSample = ∅;
7   Set of Morton code values kmc = ∅;
8   foreach tuple t in T do
9       if Hash(QCS(t)) ∈ F then
10          add t to hashSample;
11      end
12      ifMortonCode(QAS(t)) ≥ min(kmc) then
13          add t to outlierSample;
14          update kmc with MortonCode(QAS(t));
15      end
16  end
17  SAMP ← hashSample ∪ outlierSample;
18  return SAMP;
```

This algorithm can be easily modified to keep track of the top-k smallest extreme values as well (i.e., to be used with aggregation operations such as MIN). In that case, S640 would simply check for the "less than or equal to" condition, and the underlying data structure would be a max-heap that maintains the smallest extreme values observed so far. The reason why the algorithm relies on locality-sensitive hashing (and on Morton code in particular) to keep track of and retaining extreme values is because analytical queries often involve multiple aggregate functions over multiple columns, and, thus, the QAS can be large. In that case, the problem of maintaining the extreme values in the QAS becomes a multi-dimensional search and comparison problem, which can be computationally expensive—something that should be avoided in query-time sampling. In contrast, locality-sensitive hashing lets the system map the multi-dimensional space of QAS values to a single dimension while preserving the locality of points, which greatly simplifies computations. Morton code is a well-known locality-sensitive hashing scheme and is fairly easy to implement. Therefore, it may be a suitable choice for this algorithm. Nevertheless, in the sampling algorithm, it is possible to replace Morton code with other locality-sensitive hashing schemes without loss of generality.

The Morton code of a multi-dimensional data point can be computed simply by interleaving the bits in the binary representation of the coordinates of the point. For example, the two-dimensional data point at coordinates (3, 5) can be represented as (011, 101) in binary form. Then, to compute the Morton code for this point, the system can interleave the bits to obtain 011011 (with decimal value 27). The Morton code of a single-dimensional point is the same as its coordinate. In the design of our algorithm for IHS with Morton code, embodiments may be associated with point outliers. Extending the algorithm to support conditional outliers (e.g., used in timeseries data) and collective outliers (e.g., used in analog data) may also be appropriate.

According to some embodiments, a sampler may rely on Extreme Value Theory ("EVT"). In particular, a Peaks-over-Threshold ("PoT") method may detect outliers that should be included in the sampled output (in addition to the values that would have been normally selected by the UnS). One of the strengths of EVT is that it enables insight into the distribution of min and max values in a way that is almost independent of the distribution of the underlying data. In this regard, the implications of EVT for min and max values are similar to the implications of the central limit theorem for mean values.

Figure 7:
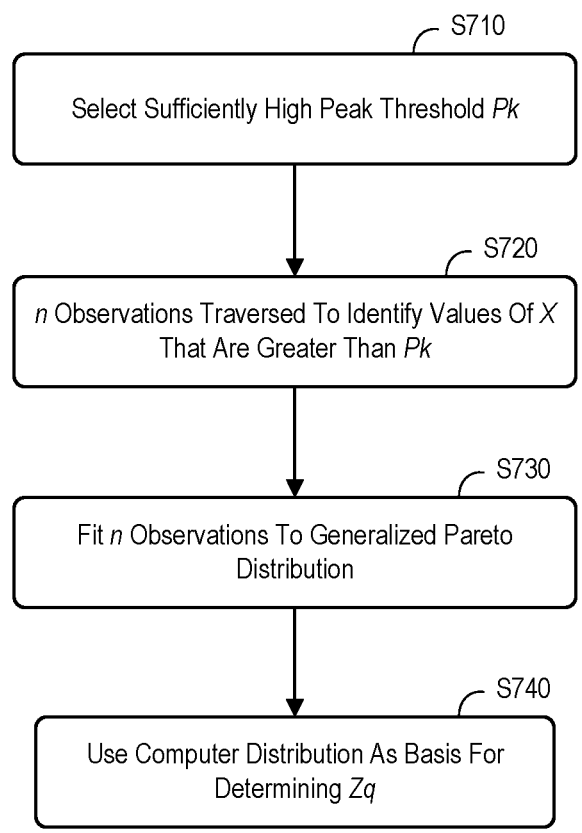
FIG. 7 is a peaks-over-threshold method in accordance with some embodiments.

Given n observations $X_1, \ldots, X_n$ and a probability value q denoting the acceptable risk, the goal of the PoT method is to find a threshold value $Z_q$ (e.g., a minimal height) such that the probability $P(X>Z_q)$ is less than q (e.g., the probability of observing a value that is greater than $Z_q$ is less than q). More specifically, FIG. 7 is a peaks-over-threshold method in accordance with some embodiments. At S710, a sufficiently high peak threshold $P_k$ is selected (this determines the minimum acceptable value of $Z_q$ that the algorithm can produce). At S720, the n observations are traversed and values of X that are greater than $P_k$ are identified. At S730, the observations that are selected in S720 are fitted to a Generalized Pareto Distribution. At S740, the distribution computed in S730 is used as the basis for determining $Z_q$.

Figure 8:
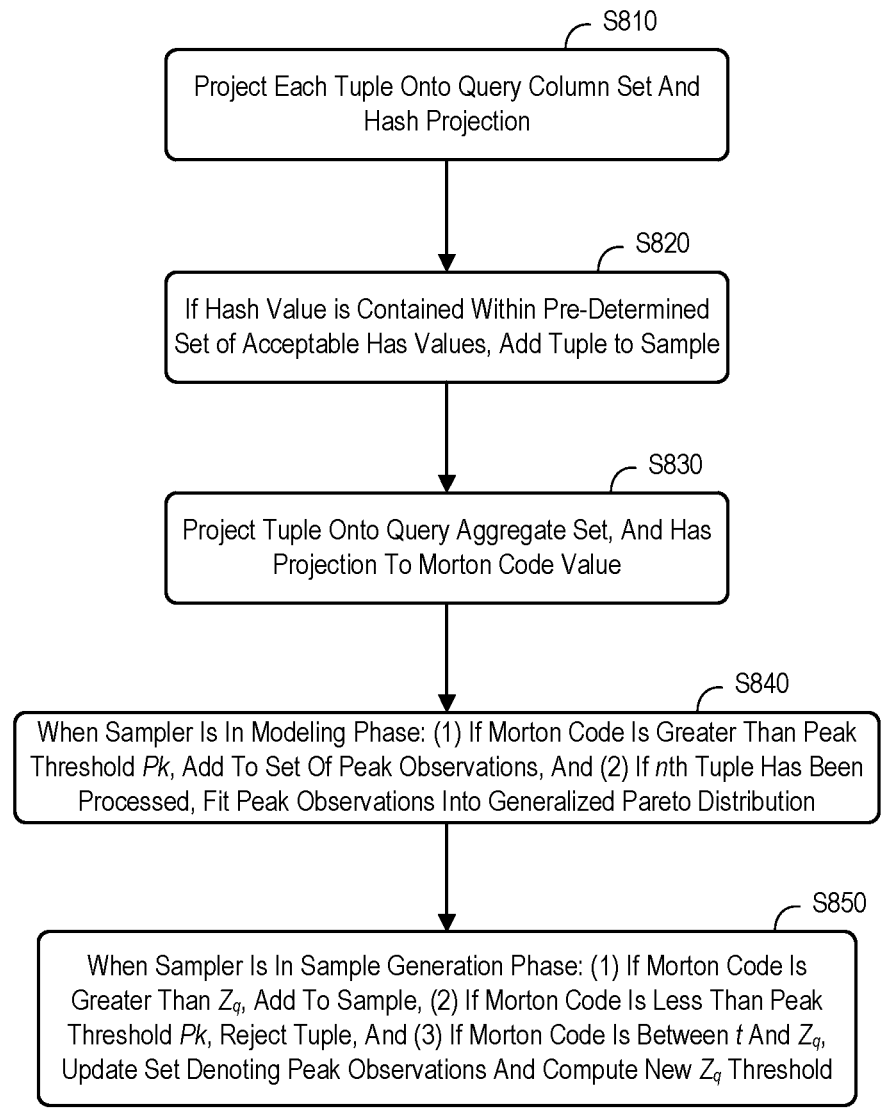
FIG. 8 an informed hash sampler with extreme value theory method according to some embodiments.

Embodiments may incorporate the PoT method into the query-time sampler "IHS with Extreme Value Theory" to compute the outliers in the QAS. As tuples (from the two input sets of equi-join) flow through the sampler, the following checks may be performed, and tuples are retained (or rejected) accordingly. In particular, FIG. 8 an informed hash sampler with extreme value theory method according to some embodiments. At S810, each tuple is projected onto its QCS, and then the projection is hashed to a value using a standard (i.e., non locality-sensitive) hash function. At S210, if the hash value that is computed in S810 is contained within a pre-determined set of acceptable hash values, then the tuple is added to the sample.

Regardless of the outcome of S820, at S830 the tuple is projected onto its QAS, and the projection is hashed to its Morton code value. Depending on the number of tuples that have been processed by the sampler so far, the sampler can be in one of two phases: (i) modeling phase or (ii) sample generation phase. If less than or equal to n tuples have been processed, where n is an input of the algorithm, then the sampler is in the modeling phase. Otherwise, the sampler is in the sample generation phase.

At S840, if the sampler is in its modeling phase and the Morton code that is computed in S830 is greater than the peak threshold Pk, then the Morton code is added to a set denoting the peak observations. If the nth tuple has been processed, then the peak observations collected in S840 are fitted to a Generalized Pareto Distribution using the maximum-likelihood estimation technique, and the $Z_q$ threshold that will be used for detecting outliers is computed.

Else (if the sampler is in the sample generation phase), at S850 if the Morton code that is computed in S830 is greater than the $Z_q$ threshold that was computed at the end of the modeling phase, then the tuple is considered an "outlier" and is added to the sample. If the Morton code that is computed in S830 is less than or equal to the peak threshold $P_k$, then the tuple is rejected. If the Morton code that is computed in S830 is greater than t but less than or equal to $Z_q$), then (i) the set denoting the peak observations is updated and (ii) a new $Z_q$ threshold is computed.

The following algorithm may implement IHS with extreme value theory:

```
1    Input: Input table T, set of acceptable hash values F, peak threshold
     P_k, number of tuples for sampling n, query column set QCS, query
     aggregate set QAS;
2    Output: A sample table SAMP (with the same schema as T).
3    Initialization:
4    Table SAMP = Ø;
5    Table hashSample = Ø;
6    Table outlierSample = Ø;
7    Count rowsProcessed = 0;
8    Morton code value mCode = 0;
9    Set of peak values peakSet = Ø;
10   Computed outlier threshold Z_q = -∞;
11   foreach tuple t in T do
12       increment rowsProcessed by 1;
13       if Hash(QCS(t)) ∈ F then
14           add t to hashSample;
15       end
16       update mCode ← MortonCode(QAS(t));
17       if rowsProcessed ≤ n then
             // Modeling Phase
18           if mCode > Pk then
19               add mCode to peakSet;
20           end
21           if rowsProcessed == n then
22               update Z_q ← potEstimate(peakSet);
23           end
24       else
             // Sampling Phase
25           if mCode > Z_q then
26               add t to outlierSample;
27           else if mCode > Pk then
28               add mCode to peakSet;
29               update Z_q ← potEstimate(peakSet);
30           end
31       end
32   end
33   SAMP ← hashSample ∪ outlierSample;
34   return SAMP;
```

Embodiments may enhance the IHS with Extreme Value Theory algorithm as follows:

1. Some embodiments of the algorithm rely on Morton codes (i.e., locality-sensitive hashing) to reduce the dimensionality of the space of QAS values (just like IHS with Morton code). Another approach to deal with multiple aggregates can be to utilize multivariate extreme value theory techniques.

2. The sampling operator is designed with the assumption that the distribution of the data that are being sampled are time-independent. Devising a variant of the sampler above that can handle time-varying distributions might utilize sliding windows and drifting variants.

According to some embodiments, a competitive selection strategy inspired by Eddies may decide which sampling operator to materialize at a given location in the query plan tree to increase query result accuracy. While embodiments focus on the problem of selecting the best sampling operator at a given location in the query plan (i.e., physical plan enumeration), embodiments might also decide where to place these operators (i.e., logical plan enumeration).

Figure 9:
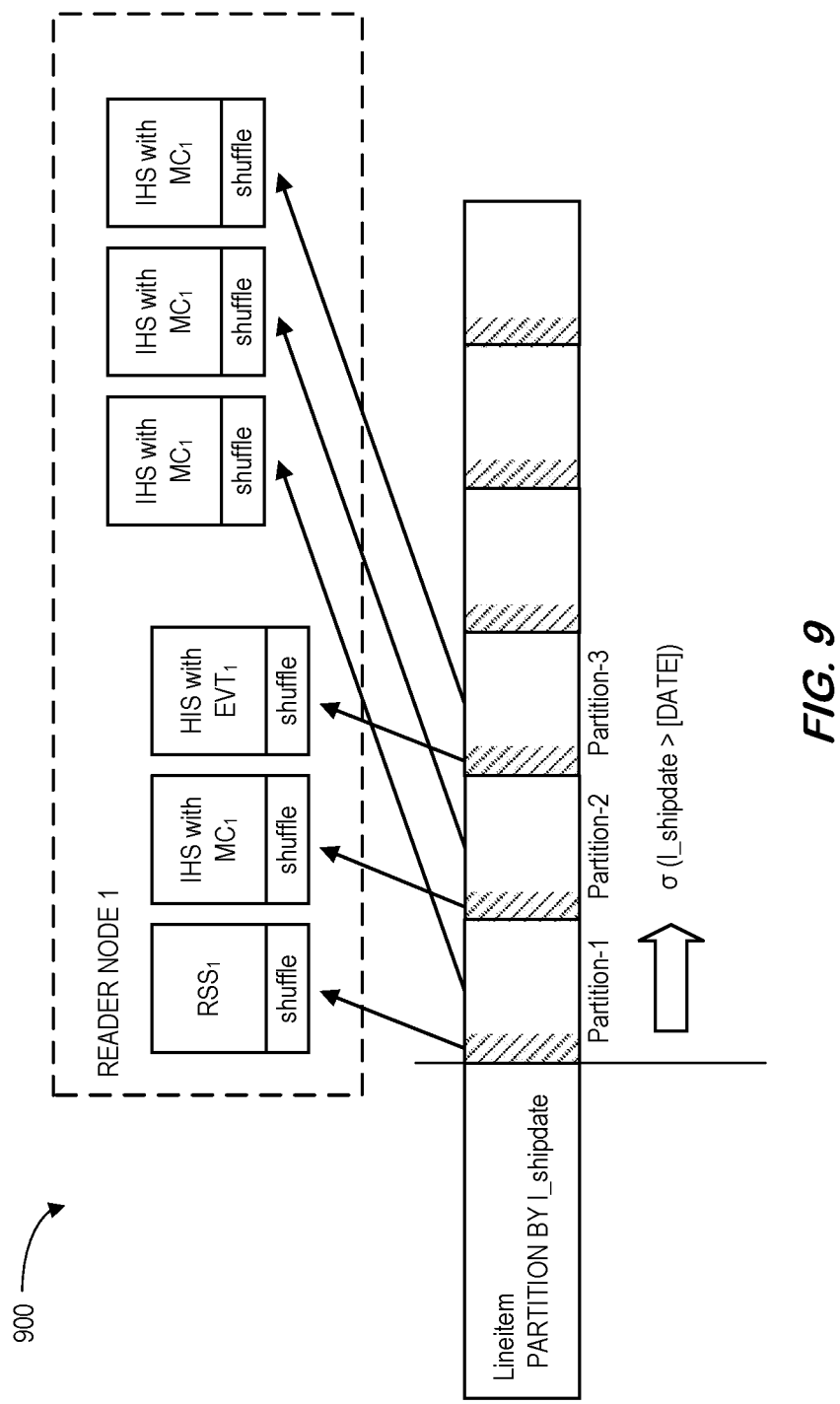
FIG. 9 illustrates sampler selection using an Eddies-like approach in accordance with some embodiments.

Some embodiments may fire up multiple samplers in the beginning and let these samplers process the early set of rows in parallel. As rows flow through these samplers, the system may track the quality of each sampler using the gap between the smallest and largest value sampled for each QAS column as a proxy measure. After a user specified number of tuples (e.g., 5%) have been processed, the sampler that achieves the highest score—combined across all QAS columns—may be selected to proceed while all the other samplers are killed. FIG. 9 illustrates 900 sampler selection using an Eddies-like approach in accordance with some embodiments.

Figure 10:
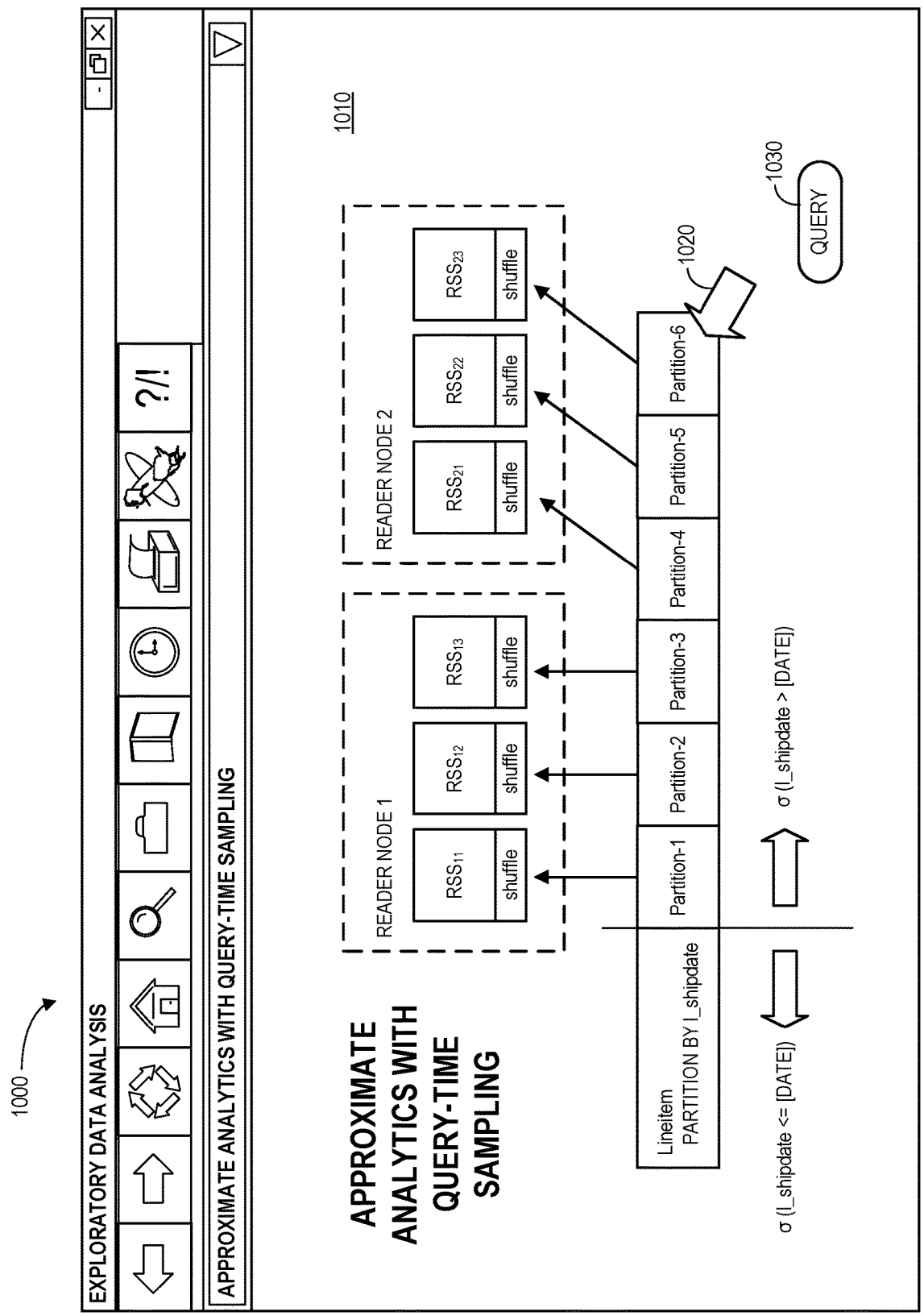
FIG. 10 is a human machine interface display according to some embodiments.

FIG. 10 is a human machine interface display 1000 in accordance with some embodiments. The display 1000 includes a graphical representation 1010 of elements of an exploratory data analysis system using approximate analytics with query-time sampling. Selection of an element (e.g., via a touch-screen or computer pointer 1020) may result in display of a pop-up window containing various options (e.g., to view an approximate analytics query, reader nodes, partitions, query results, etc.). The display 1000 may also include a user-selectable "Query" icon 1030 to initiate manual creation of an approximate analytics query (e.g., to test system performance).

Figure 11:
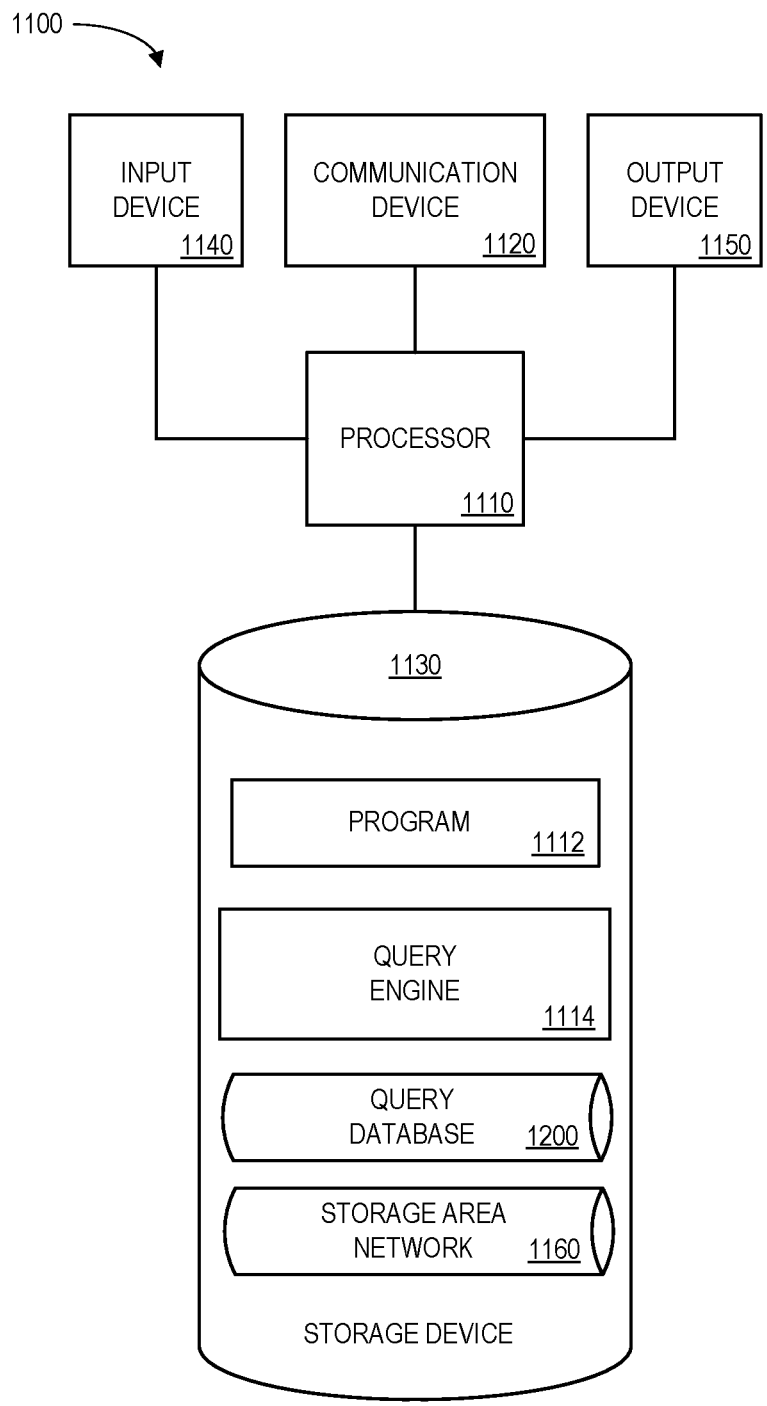
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the system 100 of FIG. 1 (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, storage devices, etc. The platform 1100 further includes an input device 1140 (e.g., a computer mouse and/or keyboard to input database or query information) and/an output device 1150 (e.g., a computer monitor to render a display, transmit results, and/or create database EDA reports). According to some embodiments, a mobile device and/or PC may be used to exchange information with the platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or query engine 1114 for controlling the processor 1110. The processor 1110 performs instructions of the programs 1112, 1114, and thereby operates in accordance with any of the embodiments described herein. For example, the processor 1110 may receive, from a user via an interactive user interface, query parameters associated with the enterprise information. The processor 1110 may then automatically generate an approximate query for exploratory data analytics using query-time sampling, the approximate query being associated with at least one of: (1) a stratified sampler with randomized row access, and (2) a hash-based, outlier aware join sampler. The approximate query may then be executed in connection with the enterprise information in the storage area network, and results of the executed approximate query may be provided by the processor 1110 to the user via the user interface.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a query database 1200 and a storage area network 1160. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
FIG. 12 illustrates a query database in accordance with some embodiments.

Referring to FIG. 12, a table is shown that represents the query database 1200 that may be stored at the platform 1100 according to some embodiments. The table may include, for example, entries identifying queries associated with EDA submitted by users. The table may also define fields 1202, 1204, 1206, 1208, 1210 for each of the entries. The fields 1202, 1204, 1206, 1208, 1210 may, according to some embodiments, specify: a query identifier 1202, an enterprise and user identifier 1204, a date and time 1206, an approximate analytics type 1208, and a result 1210. The query database 1200 may be created and updated, for example, when users submit queries associated with EDA that are used to automatically create approximate analytics with query-time sampling, etc.

The query identifier 1202 might be a unique alphanumeric label or link that is associated with a particular EDA query request submitted by a user to learn more about enterprise information. The enterprise and user identifiers 1204 might indicate who submitted the query (as well as the enterprise associated with the query), and the date and time 1206 may indicate when the query was submitted (or when a response was provided). The approximate analytics type 1208 might indicate, for example, if IHS (Morton or EVT) or RSS was used to create the approximate analytics query. The result 1210 might be a unique alphanumeric label or link containing data from the storage area network indicating information from the electronic records of the enterprise data that satisfies the time-sampling query automatically generated based on the query request.

Thus, embodiments may use query-time sampling operators to support approximate query processing. In particular, embodiments may samplers, namely, the Randomized Stratified Sampler, the Informed Hash Sampler with Morton code, and the Informed Hash Sampler with Extreme Value Theory. These samplers may be implemented as query plan operators as a PTF. Given the location in the query plan where users would like a sampler to be injected and a set of samplers to choose from, some embodiments may provide a dynamic physical plan enumeration strategy that is inspired by the Eddies framework to automatically select the sampler that retains the most percentage of extreme values.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
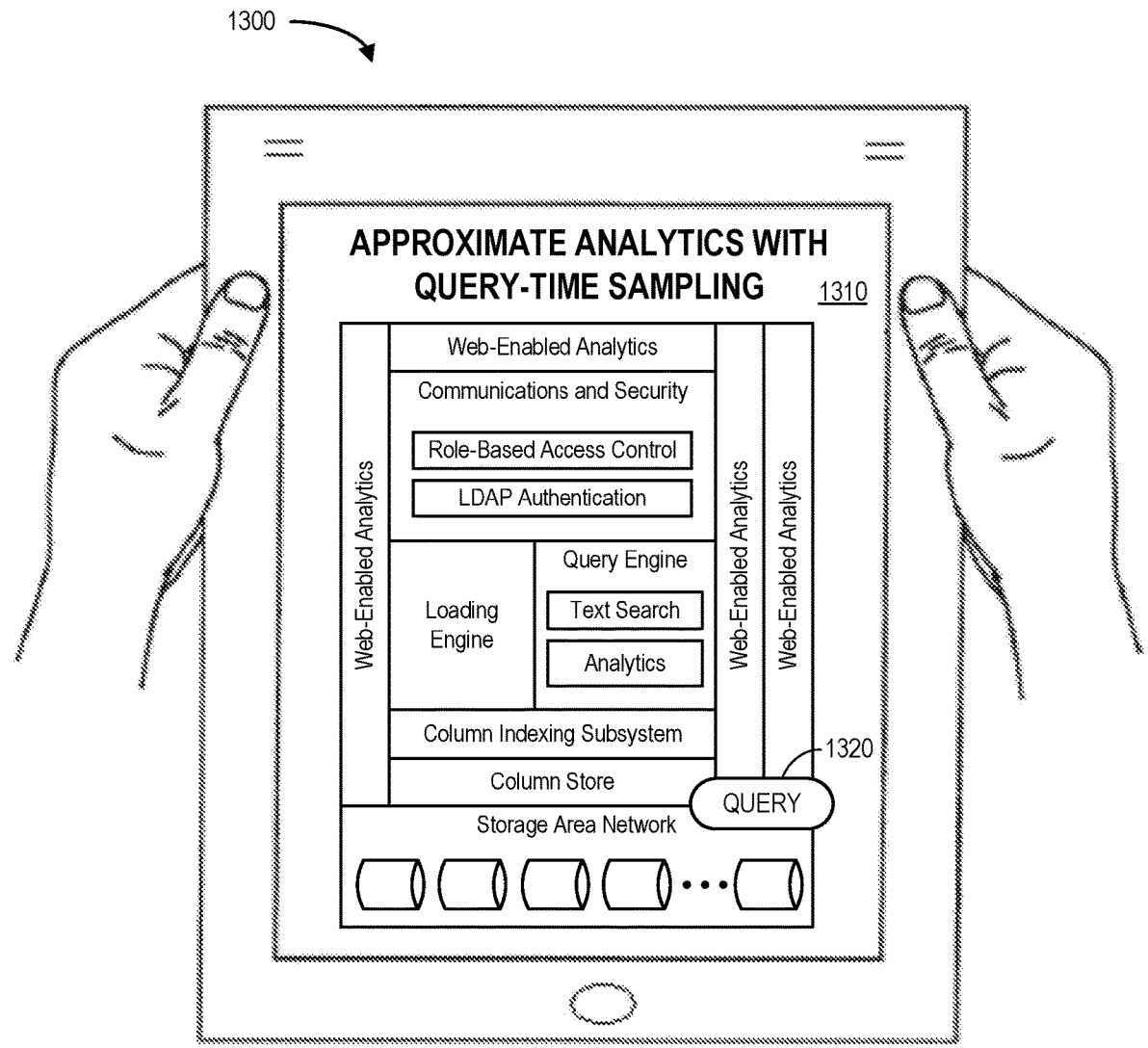
FIG. 13 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of item and contracts, any of the embodiments described herein could be applied to other types of items and contracts. Moreover, the displays shown herein are provided only as examples, and any other type of user interface could be implemented. For example, FIG. 13 shows a tablet computer 1300 rendering a display 1310 that shows disk-based column-oriented RDBMS components that may be adjusted (e.g., via a touch-screen) and/or initiated by a user (e.g., via a "Query" icon 1320).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate exploratory data analytics for an enterprise, comprising:
   (a) a storage area network, for a column-oriented relational database management system, containing electronic records storing enterprise information; and
   (b) a query engine, coupled to the storage area network, adapted to:
      (i) receive, from a user via an interactive user interface, query parameters associated with the enterprise information,
      (ii) automatically generate an approximate query for exploratory data analytics using query-time sampling wherein sampling is accomplished at runtime when a query is executed, the approximate query being associated with samples generated by at least one of: (1) a stratified sampler with randomized row access for which approximately a threshold of k rows are selected for each distinct combination of values in a query column set, the rows being selected using a count-min sketch that uses hashing to approximate a frequency of rows and consuming multiple streams of input from the database tables in parallel and considering a randomly selected subset of rows from each stream; and (2) a hash-based, outlier aware join sampler for which a hash function is applied to values of columns in a query column set,
(iii) execute the approximate query in connection with the enterprise information in the storage area network, and
(iv) provide results of said executed approximate query to the user via the user interface.

2. The system of claim 1, wherein subsequent rows of existing strata are passed with a probability p.

3. The system of claim 2, wherein the user can adjust threshold k and probability p.

4. The system of claim 1, wherein the hash-based, outlier aware join sampler retains tuples when the query aggregate set satisfies a criterion based on at least one of: (i) a locality-sensitive hashing, and (ii) extreme value theory.

5. The system of claim 4, wherein the locality-sensitive hashing utilizes a Morton code or curve.

6. The system of claim 1, wherein the query parameters are received via at least one of: (i) a table-valued user-defined function, and (ii) an external table parameterized function.

7. The system of claim 6, wherein the query parameters are received via a polymorphic table function that defines query plan operators.

8. The system of claim 1, wherein the query engine uses a competitive selection strategy to automatically select between the stratified sampler with randomized row access and the hash-based, outlier aware join sampler.

9. The system of claim 8, wherein the competitive selection strategy fires multiple samplers to process early row sets in parallel and tracks the quality of each sample using a gap between the smallest and the largest value sampled for each query aggregate set column as a quality measure.

10. The system of claim 9, wherein the competitive selection strategy selects the sampler that achieves a highest score after a user-specified number of tuples have been processed.

11. A computer-implemented method to facilitate exploratory data analytics for an enterprise, comprising:
receiving, at a query engine from a user via an interactive user interface, query parameters associated with enterprise information stored as electronic records in a storage area network for a column-oriented relational database management system;
automatically generating, by the query engine, an approximate query for exploratory data analytics using query-time sampling, the approximate query being associated with at least one of: (1) a stratified sampler with randomized row access for which approximately a threshold of k rows are selected for each distinct combination of values in a query column set, the rows being selected using a count-min sketch that uses hashing to approximate a frequency of rows and consuming multiple streams of input from the database tables in parallel and considering a randomly selected subset of rows from each stream and (2) a hash-based, outlier aware join sampler for which a hash function is applied to values of columns in a query column set;
executing the approximate query in connection with the enterprise information in the storage area network; and
providing results of said executed approximate query to the user via the user interface.

12. The method of claim 11, wherein subsequent rows of existing strata are passed with a probability p.

13. The method of claim 12, wherein the user can adjust threshold k and probability p.

14. The method of claim 11, wherein the hash-based, outlier aware join sampler retains tuples when the query aggregate set satisfies a criterion based on at least one of: (i) a locality-sensitive hashing that utilizes a Morton code or curve, and (ii) extreme value theory.

15. A non-transitory, computer readable medium having executable instructions stored therein, the medium comprising:
instructions to receive, at a query engine from a user via an interactive user interface, query parameters associated with enterprise information stored as electronic records in a storage area network for a column-oriented relational database management system;
instructions to automatically generate, by the query engine, an approximate query for exploratory data analytics using query-time sampling, the approximate query being associated with at least one of: (1) a stratified sampler with randomized row access for which approximately a threshold of k rows are selected for each distinct combination of values in a query column set the rows being selected using a count-min sketch that uses hashing to approximate a frequency of rows and consuming multiple streams of input from the database tables in parallel and considering a randomly selected subset of rows from each stream and (2) a hash-based, outlier aware join sampler for which a hash function is applied to values of columns in a query column set;
instructions to execute the approximate query in connection with the enterprise information in the storage area network and
instructions to provide results of said executed approximate query to the user via the user interface.

16. The medium of claim 15, further comprising:
instructions to use a competitive selection strategy to automatically select between the stratified sampler with randomized row access and the hash-based, outlier aware join sampler.

* * * * *